United States Patent Office 3,428,463
Patented Feb. 18, 1969

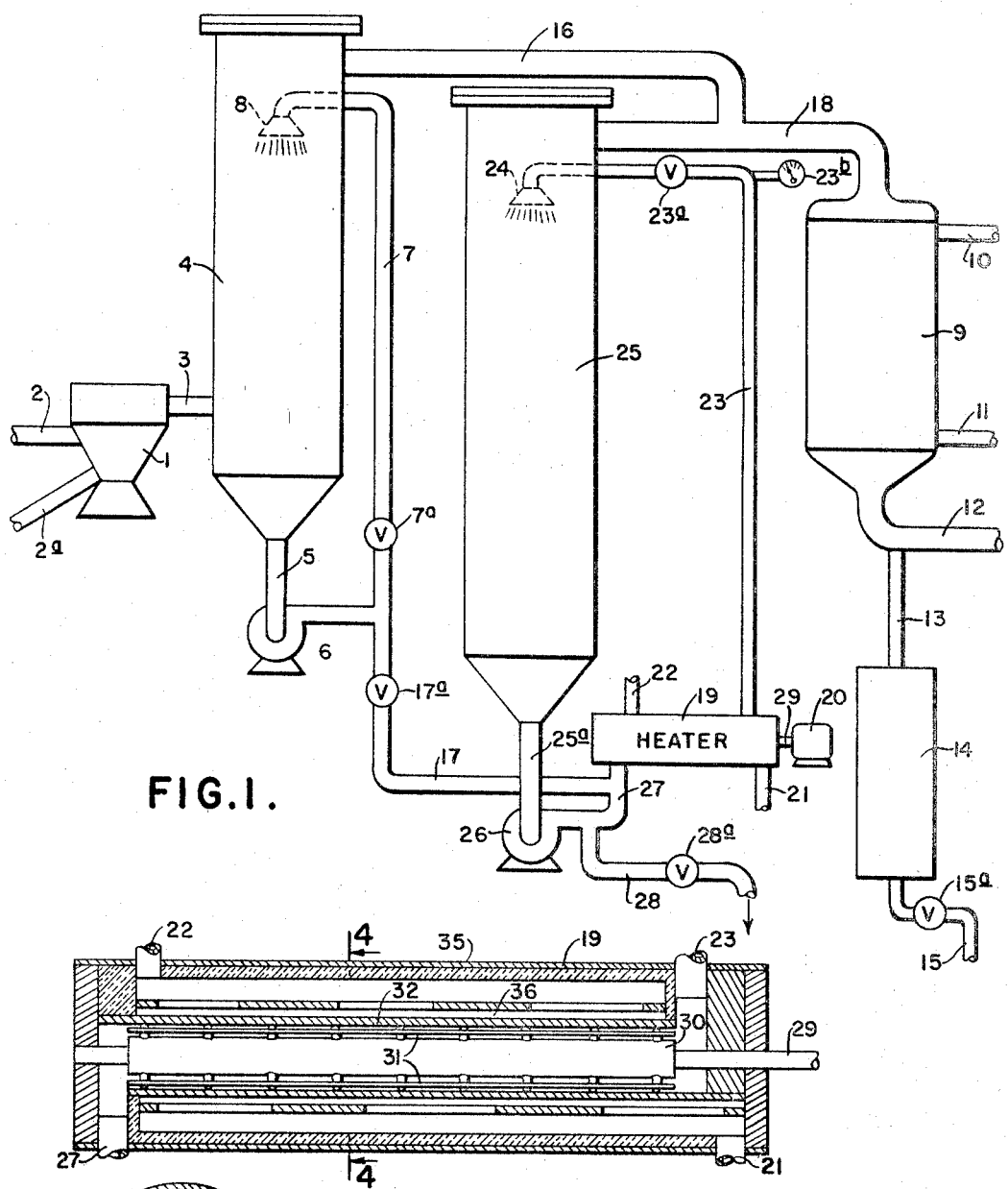
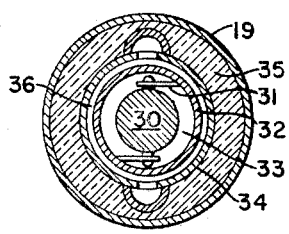
FIG.1.
FIG.3.
FIG.4.
INVENTOR
Ralph G. Sargeant
BY J. Hanson Boyden,
ATTORNEY

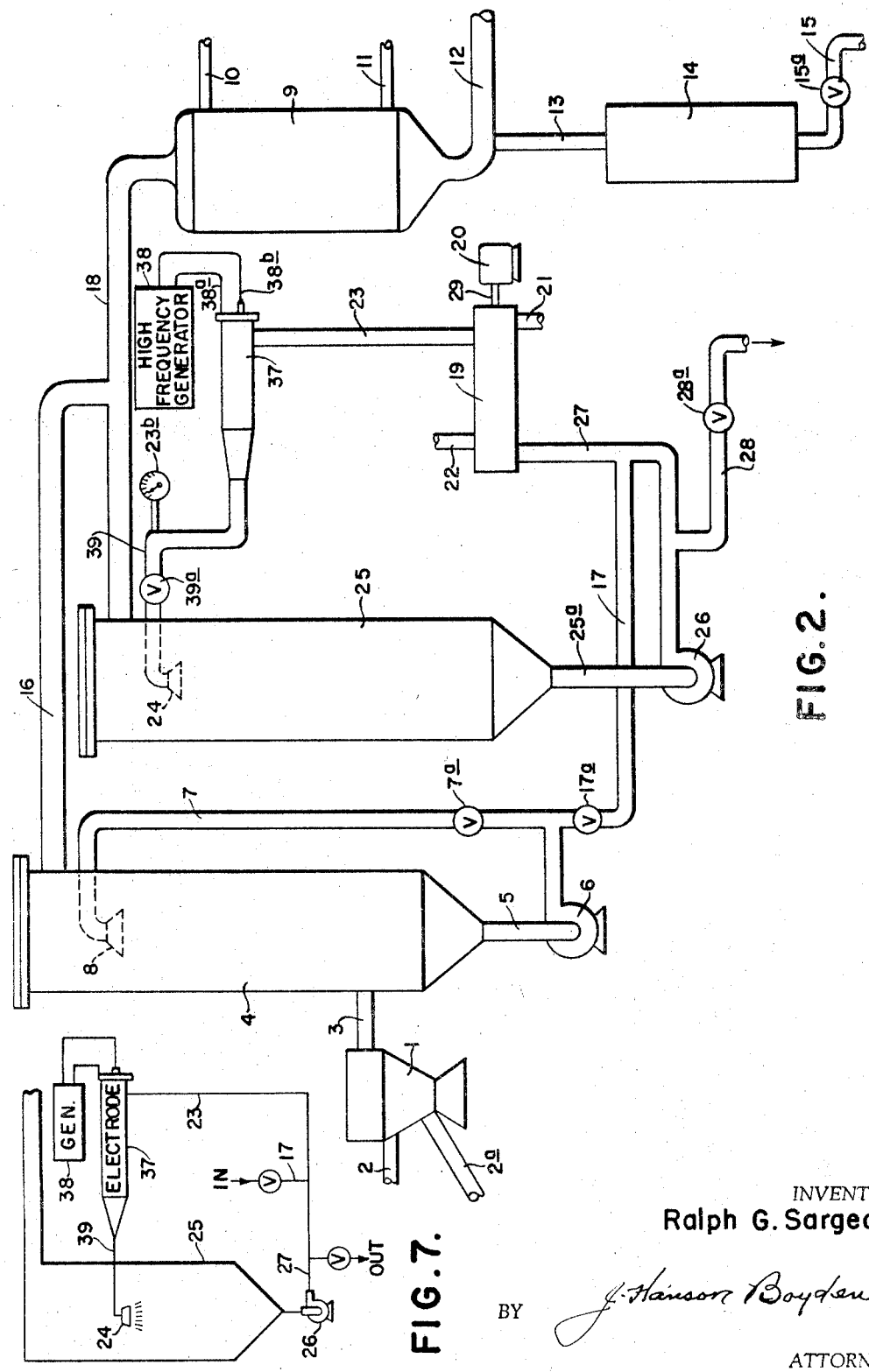

3,428,463
METHOD OF PRODUCING HIGH DENSITY, LOW VISCOSITY FRUIT JUICE CONCENTRATE
Ralph G. Sargeant, 408 W. Windsor St., Lakeland, Fla. 33803
Filed June 21, 1963, Ser. No. 289,702
U.S. Cl. 99—205
Int. Cl. A23l *1/02;* A23b *7/02*
4 Claims

ABSTRACT OF THE DISCLOSURE

Prepares orange or other fruit juice concentrates by means of radio or other high frequency electrical energy. The citrus fruit product has a density of 72° Brix, a viscosity of only 4,000 to 10,000 centipoises, and when reconstituted to form an acceptable drink, has a pulp content of 5 percent to 13 percent and a sugar to acid ratio ranging from between 14 and 16 to 1. No fresh juice is added. The product is storable indefinitely at a temperature as high as 30° F.

The juices flow in series through a thermal conduction heating device, and a special electrode for subjecting them to the action of radio frequency electrical energy, and are then de-aerated.

In order to improve the taste and flavor of the final product, the relatively cool concentrate is caused to condense and absorb relatively hot vapors of esters and flavoring constituents given off from fresh juice by heating the same.

---

While this invention may be applicable to the treatment of liquid materials in general, it relates especially to the production by evaporation of high density, low viscosity fruit juice concentrates, particularly citrus and apple juice concentrates. Some of these juices tend to jellify or become gummy when heated.

Still another object of the invention is to provide means for de-aerating the juice, especially when taken from cold storage, before it is subjected to the action of the evaporating means, to produce a high density, low viscosity concentrate.

It is desirable to de-aerate the juice to remove any off flavors that the concentrate may have developed during storage. Furthermore, the presence of air tends to oxidize the juice, and also causes the product to be a poorer thermal conductor.

Yet a further object is to devise means for first applying heat to the juices and an additional means for thereafter applying to the heated material high frequency electrical energy, such as radio frequency.

Still another object of the invention is to improve the flavor of a high density, low viscosity citrus juice concentrate by causing such concentrate to absorb esters and flavoring elements given off from fresh juice when the same is heated.

In my prior Patents No. 3,060,297, dated Oct. 23, 1962, and No. 3,072,490, dated Jan. 8, 1963, there is shown apparatus for and a method of producing high density, low viscosity citrus juice concentrate, involving subjecting the juice to the action of radio frequency electrical energy. In these patents, the juice is circuated by means of a pump from the bottom of a vertical evaporating chamber through a conduit and a high frequency electrical device, and thence through a spray head into the top of the evaporating chamber again. In said patents, the juice to be treated was introduced into the apparatus at a point between the evaporating chamber and the intake side of said pump, and it has been found that, under certain conditions, there is a possibility that a small portion of the juice may reach the outlet without passing through said electrical device.

A further object of the invention therefore is to re-arrange the apparatus so as to insure that this cannot happen. To this end I now prefer to introduce the juice to be treated into the conduit at a point between the electrical device and the discharge side of the pump. Thus, absolutely all of the juice must pass first through said electrical device before reaching the evaporating chamber.

The amount of pulp contained in the juice to be concentrated is rather critical. I have found that 5% to 13% is most desirable. This can sometimes be achieved by the use of an .020 screen on the "finisher," loosely adjusted. An object of the present invention is to provide a new method for controlling the percentage of pulp. This I accomplish by the use of a centrifuge. By varying the speed or controls, the percentage of pulp can be regulated as desired. As set forth in a prior application, the pulp contains a large proportion of the pectin complexes which are present in the juice, and the separation of these complexes is thus very important.

Finally, yet another object of the invention is to provide as a new product an improved high density, low viscosity citrus juice concentrate of novel and commercially desirable characteristics.

With the above and other objects in view, and to improve generally upon such apparatus, the invention consists in the method, and in the combination and arrangement of parts hereinafter described and claimed, and illustrated in the accompanying drawings, forming part of this specification, and in which:

FIG. 1 is a diagrammatic view showing one form of my complete apparatus;

FIG. 2 is a similar view showing another form of my complete apparatus;

FIG. 3 is a longitudinal section on an enlarged scale through the "swept surface" type of heater which I employ;

FIG. 4 is a transverse section substantially on the line 4—4 of FIG. 3;

FIG. 7 is a diagram showing a preferred method of feeding liquid in and out of my improved apparatus, where no de-aerating chamber is employed.

Figure 5:
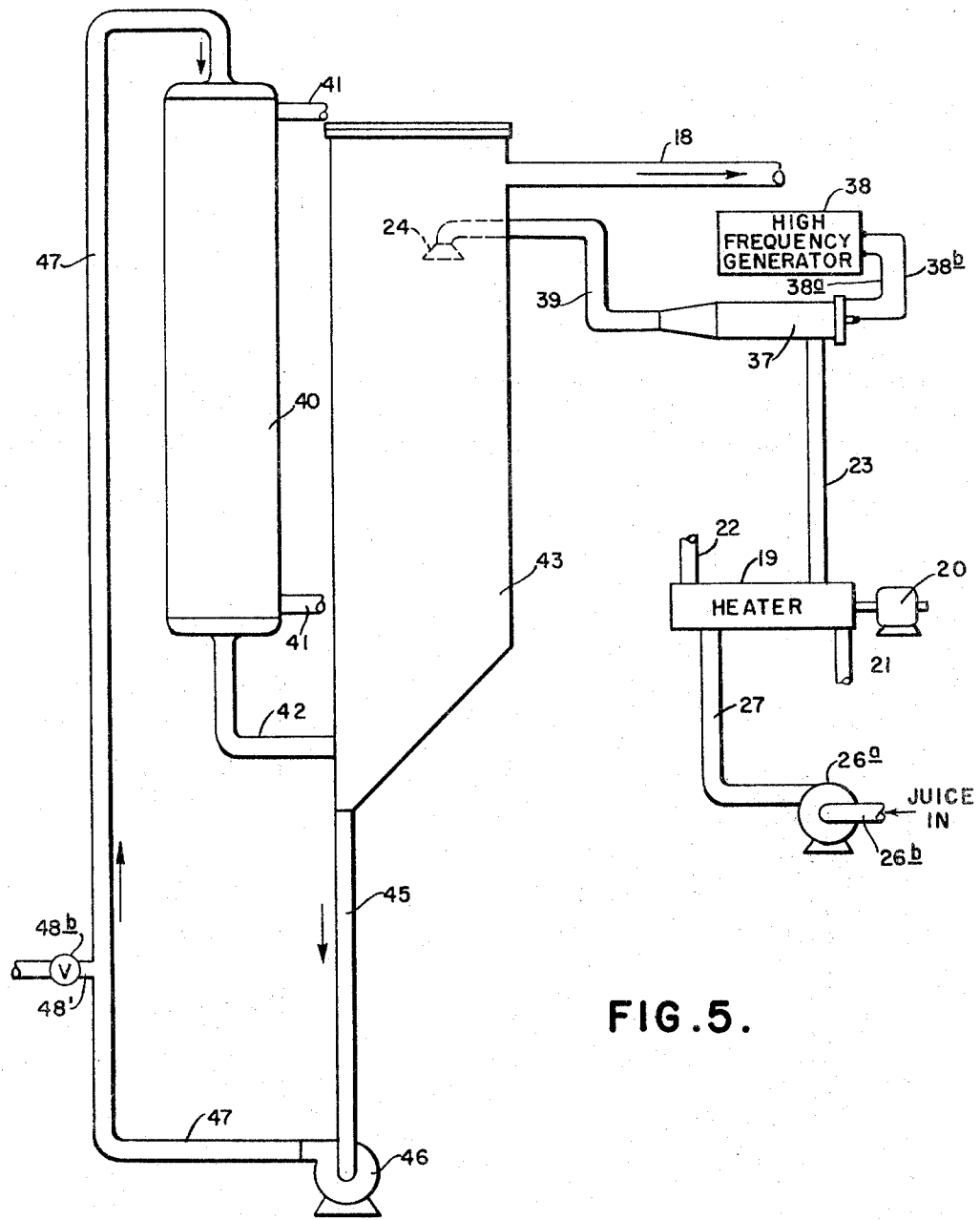
FIG. 5 is a schematic view showing the application of high frequency energy to fresh juice on its way to the first stage of a conventional steam evaporator.

While, in its broader aspects, the invention is applicable to various kinds of fruit juices, and other liquids containing water, it has special utility when used for the preparation of high density, low viscosity citrus juice concentrates, such as orange juice and it will be described in detail, by way of example, in connection with the treatment of citrus juices.

Referring to the drawings in detail, and more particularly first to FIG. 1, a centrifuge is shown at 1, as in my said prior patents. The juice to be treated is delivered from the "finisher" through pipe 2, and is separated by the centrifuge into two portions, one which I shall designate as the water-containing portion, and the other the ester-carrying portion. This latter contains the major portion of the pulp and pectin complexes, while the watery portion contains most of the sugars and acids.

The water-containing portion is delivered through a pipe 3 to a vertically disposed, elongated de-aerating chamber 4. From the bottom of this chamber extends a pipe 5 to a centrifugal pump 6, from the discharge side of which extends a pipe 7 which enters the chamber 4 at a point near the top, where it terminates in a spray head 8. Thus, the watery juice is recycled by the pump 6 through the pipe 7 and spray head 8, from which it falls to the bottom of the chamber. Meanwhile, the de-aerating chamber is maintained under a partial vacuum by means of a conduit 16, which, through a conduit 18 and condenser 9, communicates with a pipe 12 connected with any suitable type of vacuum pump (not shown). Thus, any air contained in the juice is effectively removed.

From the discharge side of the pump 6 extends another pipe 17, which, through a third pipe 27, connects with a heating device 19, the construction of which will be hereinafter described in detail. A heating medium, such as steam or hot water, is supplied through pipes 21 and 22, and the heater includes a shaft 29, driven by a motor 20. From the heater 19 extends a pipe 23 into the upper end of a vertical, elongated evaporating chamber 25, where it terminates in a spray head 24. As in my said prior patents, this chamber is preferably jacketed. From the bottom of this evaporating chamber 25 extends a pipe 25a to a centrifugal pump 26, which delivers into a pipe 28, connected with the pipe 27. Valves 7a, 17a, 23a and 28a are interposed in the pipes 7, 17, 23 and 28, respectively, to control the flow of liquid therethrough, and a pressure gauge 23b is preferably mounted on the pipe 23.

From the top of the evaporating chamber 25 extends a conduit 18 to a condenser 9, a cooling medium being supplied through pipes 10 and 11. From the vacuum pump pipe 12 at the bottom of the condenser extends a pipe 13 to a condensate receptacle 14, from which the condensate may be drawn off through a discharge pipe 15, controlled by a valve 15a.

With valve 7a open and valve 17a closed, the pump 6 continues to recycle the juice through the de-aerating chamber until all of the contained air is completely removed. Then, when valve 17a is opened, the pump 6 forces the juice from the de-aerating chamber through pipe 17 to pipe 27, where it joins the juice being concentrated and recycled by the pump 26 through the evaporating chamber 25. This latter pump forces the juice through the heater 19 and pipe 23 to the spray head 24, when the valve 23a is open. The concentrated juice may be withdrawn from the pipe 28.

It will be noted that the juice is forced through the heater under substantial hydraulic pressure. By way of example, I have successfully used pressure of from 10 to 40 or more pounds per square inch.

The heater 19 is of a very special kind known as the "swept surface" type. As shown in FIGS. 3 and 4, it comprises a cylindrical casing or housing through the center of which extends a cylindrical drum 30, supported on a shaft 29. Surrounding this drum and separated therefrom by an annular space 33 is a cylinder 32. Mounted on the surface of the drum 30 are a pair of diametrically disposed scraper blades 31 extending the length of the cylinder 32 and having free edges adapted to engage and sweep over the inner surface of this cylinder as the shaft 29 is driven by the motor 20.

Surrounding the cylinder 32 and separated from it by a space 36 is another cylindrical casing 34, this second cylinder being covered by suitable insulating material 35, the latter being enclosed by a metal shell. The juice being treated circulates through the annular space 33, from end to end, by means of the pipes 27 and 23, while a suitable heating medium is supplied through pipes 21 and 22, and flows from end to end through the space 36, in contact with the outside of the metal cylinder 32, thus heating the same. Either steam or hot water may be used, but I prefer hot water. The temperature of the water may be as high as 140° to 150° F., or more.

In the conventional steam evaporators which have been employed for many years in making fruit juice concentrates, the juice is caused to flow downwardly by gravity through a "bundle" of vertical tubes surrounded by steam. Great difficulty has been encountered, however, with such a steam evaporator, especially at higher densities, owing to the fact that the juice in contact with the hot walls of the tubes forms a film which adheres to such walls, and gradually builds up in thickness until, under certain conditions, the tubes become practically clogged with stiff, gummy material. In fact it is generally conceded by the industry that such an evaporator ceases to function after the density reaches 55° to 60° Brix.

I have discovered that by the use of a "swept surface" heater, such as described, I am able to carry the density to more than 72° Brix, without any difficulty. This is due to several factors. The rotating blades or scrapers sweep the inner surface of the heating cylinder clean at all times, so that there is no chance for a film to form or build up. The juice in the heater is under substantial hydraulic pressure, and is forced through by the pump at relatively high velocity. This results in a relatively low temperature differential between the inlet and outlet ports, so that there is not time enough for any portion of the juice to be adversely affected by the heat. To put it another way, the rapid flow and constant agitation result in all parts of the juice being heated with complete uniformity. I have also discovered that the operation of the scrapers produces a tremendous mechanical shearing action on the juice and particles of pulp, which keeps the mass broken up and also gives rise to a homogenizing effect.

It will be understood that, in producing my novel high density concentrate of 72° Brix and higher, I maintain such a high vacuum in the evaporation chamber that the water content of the juice flashes into vapor at a relatively low temperature. By using a larger and colder condenser 9, and thus increasing the rate of vapor flow from the evaporating chamber, I have been able to achieve evaporating temperatures even lower than the 80° F. mentioned in my said patents. I have operated successfully with evaporation temperatures of from 58° to 64° F. Hence, actually, very little heating has to be done by the "swept surface" heater. The fresh juice is usually stored under a certain amount of refrigeration in hot weather. Thus if the incoming juice is, say, at a temperature of around 50° F. it would be necessary for the heater to raise the temperature only 8° to 12° to bring it to the evaporating temperature. These figures are, of course, only by way of example, and in no sense limitations.

It will be noted that, while as in my said prior patents the evaporating chamber 25 is connected by conduit 18 through condenser 9 to the intake 12 of a vacuum pump (not shown), in the present invention I provide a branch conduit 16 connecting the de-aerating chamber 4 with the conduit 18, so that the same vacuum pump serves to draw the vapors from the evaporating chamber and the air from the de-aerating chamber.

In operation, the juice from the "finisher" comes in through pipe 2 to the centrifuge. From this, the esters and the major portion of the pulp and pectin complexes are discharged from the pipe 2a, while the watery portion is delivered through pipe 3, as in my said prior patents. This watery portion, which includes most of the sugars and acids, contains sufficient pulp so that the completed 72° Brix concentrate, drawn off from the pipe 28, will have, when reconstituted, a pulp content of 5% to 13%.

I find it is best to use an .020 screen on the finisher, set loosely. This usually would allow too much pulp to pass through, so, to meet some specifications, a centrifuge is used to reduce the amount of pulp in the juice portion going to the evaporator.

In some cases, however, dependent on the variety of fruit, and other factors, I may use the .020 screen alone, without the centrifuge, feeding the whole juice directly from the finisher into pipe 3. This produces a concentrate that is commercially acceptable.

In FIG. 2 I have shown the same equipment as in FIG. 1, with corresponding parts similarly numbered. In FIG. 2, however, I have included an additional feature, namely, means for subjecting the juice to radio or other high frequency electrical energy before it enters the evaporating chamber. This electrical means may be similar to that illustrated in my said prior patents, and includes an electrode structure 37 and a high frequency generator 38, connected with the central electrode and casing by means of leads 38a and 38b.

While in my said prior patents, I do not disclose any heating means operating by thermal conduction, in the present invention I employ a heating device 19, similar to that shown and described in connection with FIGS. 1, 3 and 4, and cause the juice to circulate through this heating device and the electrode structure 37 in series.

It is usually desirable to heat the juice to some extent to bring it up to the evaporating temperature, and as explained in my said prior Patent No. 3,072,490, the means for applying high frequency electrical energy to the juice generates very little heat, its main function being to produce effects and changes which are of great importance but not fully understood. I therefore find that it is advantageous to heat the juice before it is subjected to the high frequency electrical energy. By way of example, but in no sense a limitation, I find that the temperature of the juice may advantageously be raised 6° to 8° F. as it passes through the heater 19, and the temperature of this heated juice may be raised 2° or 3° F. more as it passes through the electrical device 37. Thus the temperature differentials in both the heater 19 and electrical device 37 are very low.

The citrus juice concentrate contains a large proportion of water, mixed with sugars and acids, and the ratio of sugars to acids is important. I find that a ratio of from 14 to 16 to one is preferable. To make the ratio either substantially above or below this range may cause jellification, depending upon the variety of orange.

While in my said prior Patent No. 3,072,490, I disclosed treating the juice with high frequency electrical energy, one of the effects of such treatment was unknown to me at the time of filing the application resulting in said patent. I have now discovered that this treatment results, among other things, in changing the sugar-acid ratio of the concentrate. Tests have been run showing that, by treating a juice having a given sugar-acid ratio with high frequency electrical energy under hydraulic pressure, this ratio can be raised or lowered as desired by changing the frequency of the electrical energy, and the amount of pressure. In general, raising the frequency raises the ratio, and vice versa, but this may vary with different kinds of oranges. In any event, care should be taken to avoid lowering the frequency to a point where electrolysis occurs. Increasing the hydraulic pressure also raises the ratio. Thus the sugar-acid ratio may be changed at any time during operation of the equipment.

I have now also discovered that the high frequency electrical energy seems to have a beneficial effect on the bacteria content of the juice. The plate count is lower when using high frequency energy as in my said patents and FIG. 2 of the present application than when not using any such energy as in FIG. 1 of the present application.

It will, of course, be understood that the juice flows in a solid stream under substantial hydraulic pressure though the electrode structure while being subjected to the high frequency electrical energy. In the arrangement shown in FIG. 2, the pressure in the heater 19 and electrode structure 27 is substantially the same, and may advantageously be as much as 40 pounds per square inch, or more.

With the above described equipment and method, I have produced juice concentrates of a density of 72° Brix, and higher, and of a viscosity of 4,000 to 10,000 centipoises at 75° F. These concentrates, having a pulp content of around 7%, can be stored indefinitely without deterioration at up to 30° F., and when stored at 0° F. do not gel. Moreover, when reconstituted by mixing with water, they show no tendency to separate.

It will be understood that satisfactory products of this character can be made with the equipment shown in either FIGS. 1 or 2, that is to say, either with or without the high frequency electrical treatment. The use of the electrical energy, however, produces a concentrate of better flavor and stability, and of lower viscosity, as well as a lower bacteria count.

While I have described starting with fresh "single strength" juice, and running the concentrate up to 72° Brix in my improved equipment, I may follow an alternate two-step method. As above mentioned, it has been and is common practice to concentrate citrus juice up to 50° or 55° Brix by means of conventional steam evaporators. I can then take this 50° to 55° Brix concentrate from storage, and run the density up to 72° Brix or more by means of my apparatus. I have done this successfully. In this case, a centrifuge may or may not be used, but the de-aerating chamber is especially advantageous in producing the final high density concentrate since the stored, low density concentrate often contains substantial quantities of air, and develops off flavors.

In FIG. 5 I have illustrated schematically an arrangement by which a conventional steam evaporator can be used for the purpose of accomplishing the preliminary concentration.

In this figure, 40 designates a heat exchanger comprising a "nest" or "bundle" of tubes, enclosed in a shell through which steam is caused to circulate by means of pipes 41. The juice flows through the tubes, which are surrounded by steam, and thus heated to a relatively high temperature, such as 85° to 90° F. The tubes are preferably of flattened cross section.

From the heat exchanger 40, the hot juice is discharged through pipe 42 into the lower part of an evaporating chamber or vapor separator 43, maintained under vacuum through pipe 18, as before, and as in my prior patents. The unvaporized residue flows downwardly through pipe 45, to pump 46, by which it is forced up through pipe 47 to the top of the heat exchanger.

In this arrangement I may or may not employ the "swept surface" heater, shown at 19, but it is of the utmost importance to include the high frequency electrode device 37, connected as shown. The fresh juice is drawn by pump 26a in through pipe 26b, and is forced under substantial hydraulic pressure up through pipe 27, into and through the heater 19 (if employed), and thence by pipe 23 into and through the high frequency electrode device 37. From this electrode device the fresh juice is discharged through pipe 39 and spray head 24 into the evaporating chamber 43. (The same reference characters as in FIGS. 1 and 2 are used in FIG. 5 to designate the corresponding parts, where present.) If the heater 19 is not used, the pump 26a would deliver direct to the electrode device through pipe 23.

The apparatus illustrated in FIG. 5 (other than the heater 19 and electrode device 37) constitute the first stage of a conventional steam evaporator. Pipe 48′, controlled by valve 48b, leads to the second stage (not shown) of the conventional steam evaporator, which operates in a similar manner.

The fresh juice coming into pump 26a is usually about 12° Brix. In the first stage of the steam evaporator, it is raised to a density of 20° to 22° Brix, while, when discharged from the second stage, it usually has a density of around 45° to 55° Brix. This preliminary concentration is effected at a relatively high temperature, above 80° F. such as 85° to 90° F., as above mentioned. To successfully raise the concentration higher, say, to 72° Brix, it is necessary to use my improved method and apparatus as covered by my said patents, in which the juice never comes in contact with any surface hotter than 80° F.

When using the above described method, namely, first achieving a density of around 45° to 55° Brix in a conventional steam evaporator, at a relatively high temperature, and then raising the density to 72° Brix or more, by means of my patented low temperature method and apparatus, it is important to treat the incoming fresh juice with high frequency electrical energy, as shown in FIG. 5, before it reaches the evaporator. When using high frequency electrical energy in this way, the described two-step process yields a high density product which is commercially acceptable, while without subjecting the fresh juice to this preliminary electrical treatment, I have found that the final high density concentrate is not of acceptable quality. This appears to be due to the observed fact that this preliminary electrical treatment of the incoming fresh juice results in significantly lowering the viscosity of the concentrate.

In my said prior Patent No. 3,072,490, I have explained how, by means of using high frequency electrical energy and low temperatures, I have been able to produce citrus concentrates of a density of 72° Brix or more, free from any caramelization, of low viscosity, and excellent taste and flavor, without the addition of fresh juice to the product as proposed by MacDowell in his Patent No. 2,453,109. The same is true of the method and apparatus constituting the present invention. If, however, it is desired to still further improve the flavor of the product and to provide a high density concentrate of super-excellence and exceptionally fine taste, I may use the method shown in FIG. 6.

Figure 6:
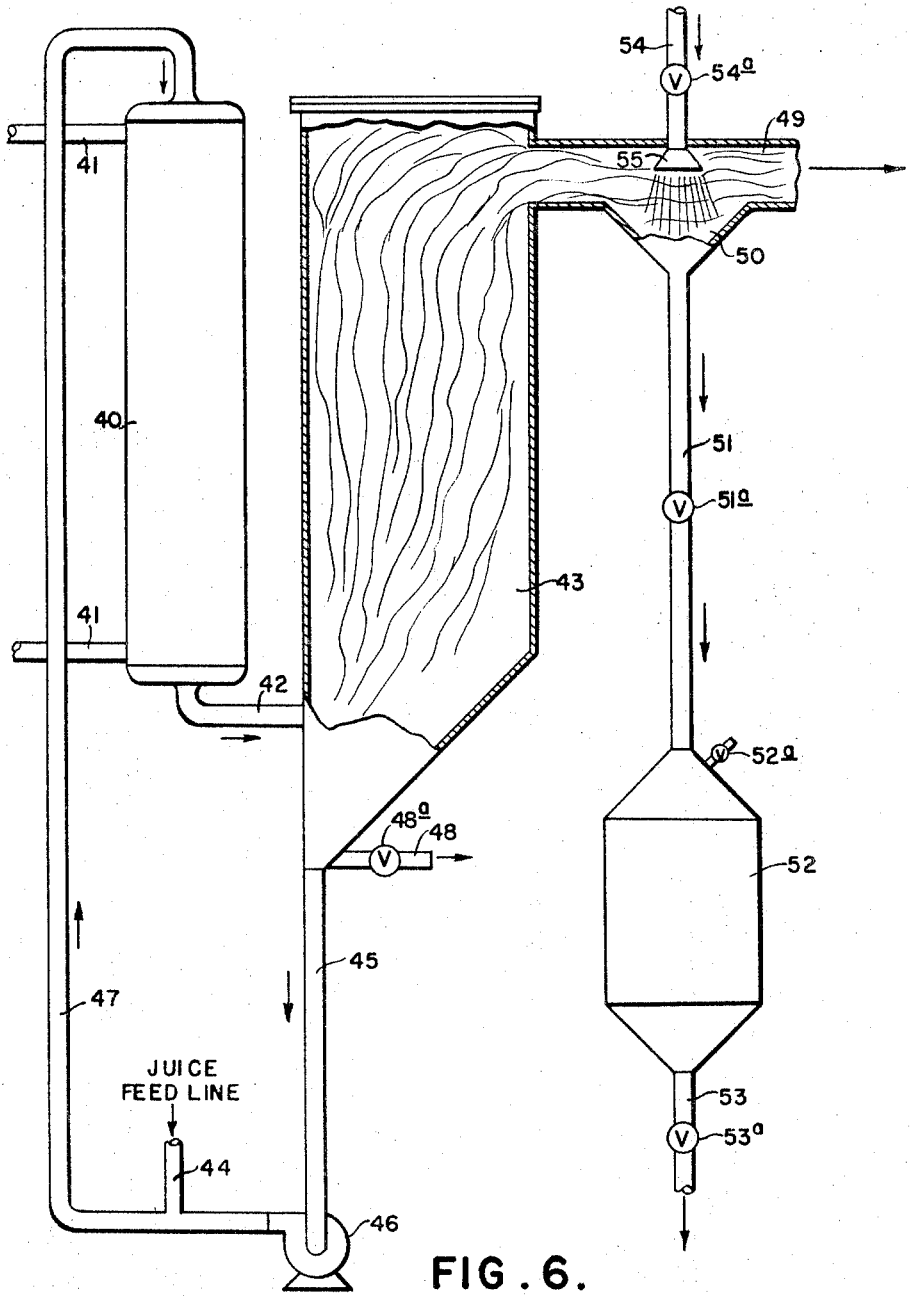
FIG. 6 is a view similar to FIG. 5, but showing my novel method of and apparatus for still further improving the flavor of my high density citrus juice concentrate.

As is well known, when fresh juice is treated in a conventional steam evaporator having several stages, most of the esters and flavoring ingredients are given off with the vapors coming from the first stage, in which the density is raised from 12° to about 22° Brix. In FIG. 6, I have illustrated how these esters and flavoring elements can be recaptured, condensed and absorbed into my high density concentrate.

Referring to FIG. 6 in detail, 40, as in FIG. 5, indicates a heat exchanger of the first stage of a steam evaporator, consisting of a shell-and-tube structure, preferably having flat tubes, heated by steam through pipes 41. From the bottom of this shell-and-tube type heater extends a pipe 42, delivering into a vapor chamber 43, connected by conduit 49 with a suitable vacuum pump (not shown). From the bottom of this chamber, also as in FIG. 5, extends a pipe 45 to a pump 46, which delivers the juice through a vertical pipe 47 into the upper end of the shell-and-tube heat exchanger 40. Fresh juice is fed in, preferably by means of a pump (not shown) through a pipe 44, tapping the pipe 47 at a point between the pump 46 and heat exchanger 40. The partially concentrated juice is drawn off to the second stage of the evaporator through pipe 48, controlled by valve 48a.

The heated water, esters and flavoring elements discharged from the pipe 42 pass, under the influence of the vacuum, into the chamber 43 in the form of vapors, and these are drawn by the vacuum pump through the conduit 49. The lower side of this conduit is formed with a hopper or funnel 50, and from this funnel extends a pipe 51 downwardly to a receptable 52, provided with a vent 52a. The pipe 51 is controlled by a valve 51a, and from the bottom of the receptacle 52 extends a discharge pipe 53, controlled by a valve 53a.

A pipe 54, controlled by a valve 54a, enters the vapor conduit 49 vertically, immediately above the funnel 50, and terminates in the conduit in a spray head 55.

My improved concentrate, preferably of a density of 75° to 80° Brix, is fed in through the pipe 54, and is sprayed transversely across the conduit 49 into the funnel 50.

As will be understood, the vapors passing through the conduit 49 are relatively hot, say around 90° F., and the high density concentrate which is sprayed into them from the spray head is relatively cool, say around 55° to 60° F. This cold, high density spray therefore condenses and absorbs a substantial portion of the vapors, including the esters and flavoring elements, and its taste and flavor are improved accordingly. In the process, the concentrate is somewhat diluted, and its density reduced from the original 75° or 80° Brix to the standard 72° Brix, or whatever is desired.

In my said prior patents I have shown a pipe for introducing the fresh juice into the bottom of the evaporating chamber, while the finished concentrate is drawn off on the discharge side of the circulating pump. With such an arrangement, there is a possibility that a small amount of fresh juice may reach the outlet without being subjected to the high frequency electrical energy. Although this may be desirable in some instances, I can ensure against it by arranging the inlet and outlet as shown in FIG. 7. By reference to this diagram, it will be seen that I now introduce the juice through pipe 17 into the circulating line 27, 23 at a point in this line between the discharge side of the pump 26 and the electrical device, so that all of the juice must be subjected to the high frequency electrical energy before reaching the evaporating chamber, and that it is impossible for the fresh juice to escape from the outlet, which is located between the inlet and the discharge side of the pump.

While in the simplified diagram of FIG. 7 I have illustrated only the electrical device in the circulating line, the same as in my said patents, it will be understood that the same relative arrangement of inlet and outlet can be used where a heater only is employed, as in FIG. 1, or where both the heater and electrical device are used, as in FIG. 2. In fact, in FIG. 1 the inlet is located between the discharge side of the pump and the heater, while in FIG. 2 the arrangement is the same, so that the incoming juice passes first through the heater and then through the electrical device before entering the evaporating chamber. In either figure, it is impossible for any of the untreated juice to reach the outlet.

What I claim is:

1. The method of concentrating fruit juices which comprises causing the juices to flow in a continuous confined stream under hydraulic pressure, applying heat by thermal conduction to such stream at one point, applying to such heated stream at another point high frequency electrical oscillations, and then discharging said stream into partial vacuum at such a temperature as to cause the water present to flash into vapor.

2. In the production of high density citrus juice concentrate, the method of improving the flavor of the concentrate which comprises heating fresh citrus juice, discharging the heated juice into a chamber maintained at such a vacuum that vapors of esters and flavoring constituents are given off, and spraying concentrated juices of higher density than the desired final product and of substantially lower temperature than said vapors into contact with said vapors, whereby said vapors are condensed in and absorbed by said concentrated juice, and the density of the final product lowered to the desired extent.

3. A method in accordance with claim 2 in which the vapors are caused to travel as a stream along a confined path, and spraying concentrated juice of substantially lower temperature transversely across such path, whereby the vapors are condensed and adsorbed by said concentrated juice.

4. The method of producing a high density, low viscosity citrus juice concentrate by a two-step process, which comprises causing fresh juice to flow in a confined stream under substantial hydraulic pressure into a heating zone operating at a temperature of between 80° and 90° F., subjecting the juice while so flowing, but before it enters said heating zone, to high frequency electrical energy, allowing the juice to evaporate at such temperature until its density reaches from 45° to 55° Brix, and thereafter evaporating the thus partially concentrated juice at a temperature (substantially below) between 60° and 80° F., and under high vacuum, until it reaches the final desired density of at least 72° Brix.

References Cited

UNITED STATES PATENTS 2,453,109  11/1948  MacDowell et al. ____ 99—205 X
3,072,490  1/1963  Sargeant _____ 99—205

HYMAN LORD, *Primary Examiner.*

UNITED STATES PATENT OFFICE
CERTIFICATE OF CORRECTION

Patent No. 3,428,463                    February 18, 1969

Ralph G. Sargeant

It is certified that error appears in the above identified patent and that said Letters Patent are hereby corrected as shown below:

Column 9, line 5, cancel "(substantially below)".

Signed and sealed this 24th day of March 1970.

(SEAL)
Attest:

Edward M. Fletcher, Jr.                 WILLIAM E. SCHUYLER, JR
Attesting Officer                               Commissioner of Patents